Feb. 11, 1969
R. K. HEDLUND
3,426,970
VIBRATION DAMPING NOZZLE AND FLAPPER
Original Filed July 13, 1966
FIG. 1
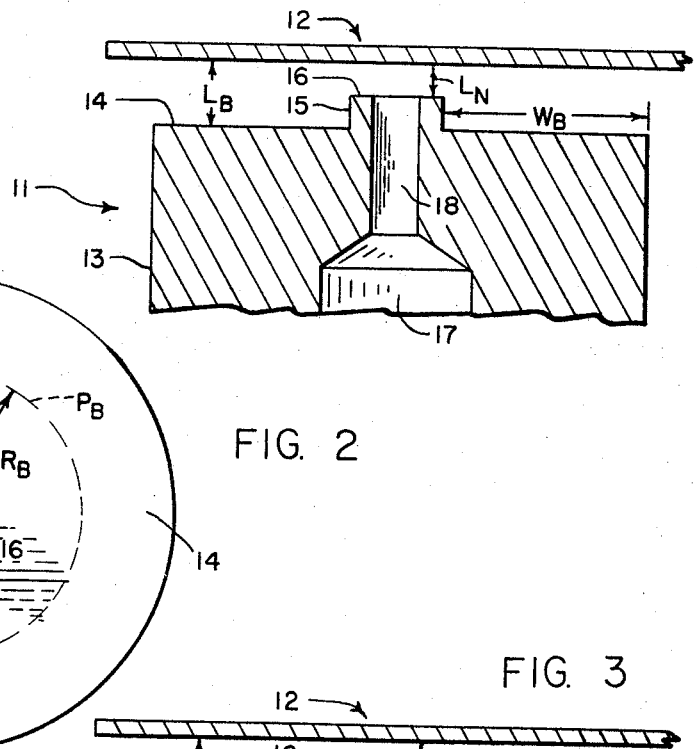
FIG. 2
FIG. 3
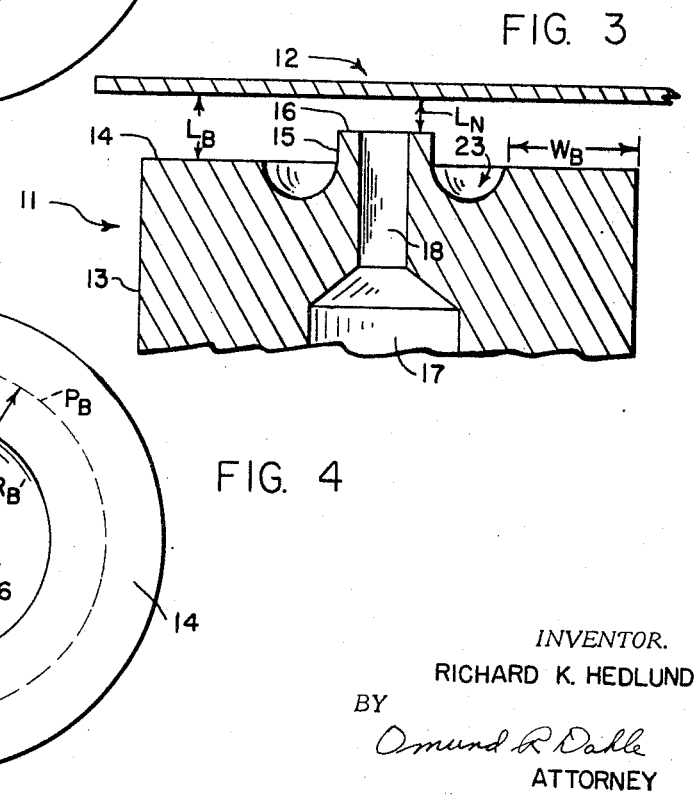
FIG. 4
INVENTOR.
RICHARD K. HEDLUND
BY
Omund R Dahle
ATTORNEY

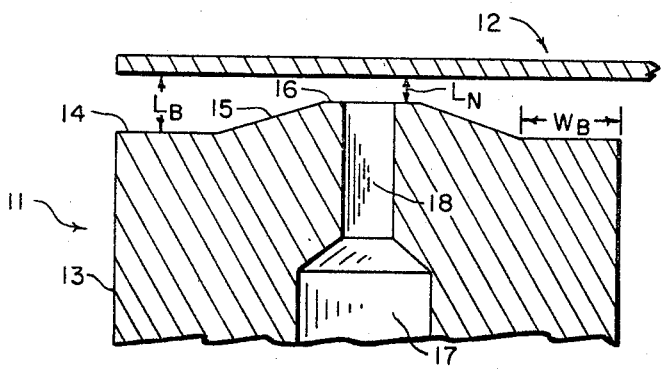
FIG. 5
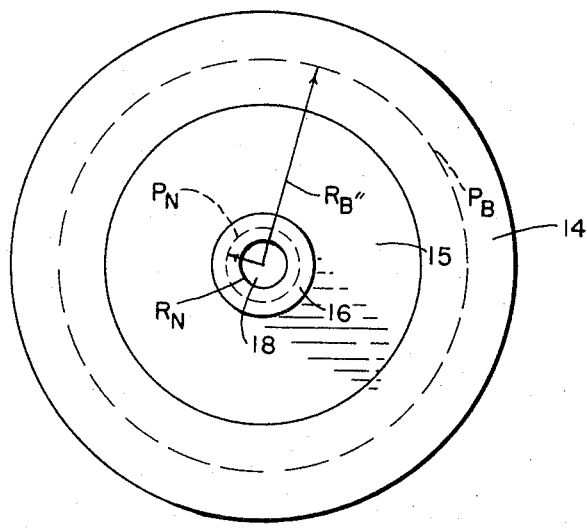
FIG. 6
FIG. 7
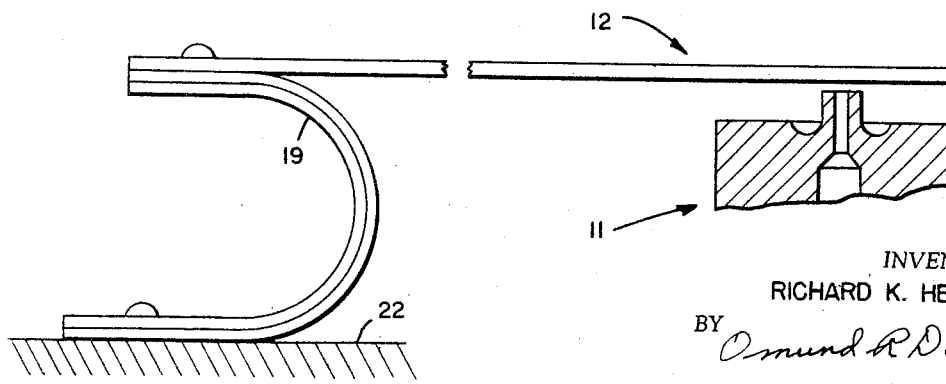
INVENTOR.
RICHARD K. HEDLUND
BY Osmund R Dahle
ATTORNEY – # United States Patent Office 3,426,970
Patented Feb. 11, 1969

3,426,970
VIBRATION DAMPING NOZZLE AND FLAPPER
Richard K. Hedlund, Mount Prospect, Ill., assignor to Honeywell Inc., Minneapolis, Minn., a corporation of Delaware
Continuation of application Ser. No. 564,767, July 13, 1966. This application Mar. 25, 1968, Ser. No. 715,942
U.S. Cl. 236—87   10 Claims
Int. Cl. G05d 16/02, 23/02

ABSTRACT OF THE DISCLOSURE

A nozzle and flapper combination for use in pneumatic control devices, the nozzle having a unique structure that serves to dampen vibrations within the flapper.

---

This application is a continuation of application Ser. No. 564,767, filed July 13, 1966, now abandoned.

This invention relates to a problem of vibration often encountered in nozzle-flapper applications, and teaches a novel nozzle structure capable of damping such vibrations.

Conventional nozzles and cooperating flappers are widely employed in the pneumatics art to provide a proportional valving function. They experience their greatest usage in pneumatic thermostats and like devices where the modulating flapper is made from a temperature sensitive strip of bimetal. For a given change in temperature, the flapper approaches or moves away from the nozzle thereby controlling the amount of air bleeding to atmosphere through the nozzle. Since the amount of flow bleeding through the nozzle determines the pressure upstream with respect to the nozzle, the flapper can, by varying its position, provide a variable control pressure that can be used to actuate, for example, a damper or valve.

Because it is ordinarily mounted in a cantilever fashion within a pneumatic device, a flapper is easily prompted into a state of vibration at its fundamental vibrating frequency by the dynamic air pressure that builds up and bleeds through the nozzle. This vibration is largely a function of the distance between the nozzle and flapper, diminishing as the flapper gets very close or very far away from the nozzle. It can be harmful to the operational stability of the pneumatic device but moreover, the vibration is usually accompanied by a noise that is quite irksome if the device has been located in otherwise quiet surroundings.

One method of preventing this vibration is to weight the flapper. Although this is a good method of damping vibrations, it seriously impairs the temperature sensitivity of the flapper, thereby hampering operation of the pneumatic device. Another solution to the problem is to reflect the undulating pressure waves created by the flapper vibrating at its fundamental frequency in such a manner that the reflected pressure waves are 180° out of phase with those created by the flapper, resulting in reciprocal cancellation of both pressure waves and negation of the vibrations. This method has no adverse effect on the flapper temperature sensitivity, but placement of the reflecting device depends on the flapper fundamental frequency. For a particular placement, only the vibrations of a flapper having a particular fundamental frequency will be damped.

The present invention provides a solution to the problem by creating a cushion of air between the nozzle and flapper that dampens the flapper vibrations. The cushion of air is brought about by a novel nozzle structure employing dual surfaces that are dimensionally related with the flapper position.

The inventive nozzle is of extremely simple design and operation, and can be used with flappers of varying fundamental frequencies. It is the only nozzle having a structure designed to perform a vibration damping function.

In the drawings:
FIGURE 1 is a cross-sectional side view of an embodiment incorporating the inventive concept;
FIGURE 2 is a top view of FIGURE 1;
FIGURE 3 is a cross-sectional view of the preferred embodiment of the invention;
FIGURE 4 is a top view of FIGURE 3;
FIGURE 5 is a cross-sectional side view of an alternative embodiment of the invention;
FIGURE 6 is a top view of FIGURE 5; and
FIGURE 7 is a cross-sectional view of the preferred embodiment that further discloses the embodiment members mounted in such a way as to be susceptible to vibration.

In FIGURE 1, a nozzle is represented generally by the numeral 11. Operating in association therewith is variable position flapper shown generally at 12. Nozzle 11 consists of a member having a surface 14, hereinafter referred to as the base surface. Projecting above the base surface 14 is a surface 16 referred to below as the nozzle surface. These two surfaces are concentric, and essentially parallel to each other and to flapper 12. Intermediate the base surface 14 and the nozzle surface 16 is a connecting surface 15 that is, in this embodiment, perpendicular to the surfaces 14 and 16. Base surface 14, connecting surface 15 and nozzle surface 16 together form the effective operating surface of the nozzle.

Within nozzle 12 is a passageway 17 adapted to receive fluid from a pressure source (not shown). Passageway 17 narrows to a channel 18 that opens on nozzle surface 16 at its center. Channel 18 has a predetermined cross-sectional area to provide a desired flow rate from nozzle 11.

Nozzle surface 16 is annular due to channel 18, having an inner radius and an outer radius that define a mean radius, designated $R_n$ in FIGURE 2. Base surface 14 is likewise annular, having an inner radius and an outer radius that define a mean radius designated $R_b$. The mean radius referred to here is taken to be the halfway point between the inner and outer radii. The mean radius $R_n$ of nozzle surface 16 can be used to define a mean perimeter or circumference $P_n$, the magnitude of which is $2\pi R_n$. A mean perimeter $P_b$ can likewise be determined for base surface 14, having a magnitude of $2\pi R_b$.

The clearance distance between base surface 14 and flapper 12 is defined as the normal distance from any point on the mean perimeter $P_b$ of base surface 14 to the flapper 12. It is designated $L_b$ in FIGURE 1. A clearance distance between nozzle surface 16 and flapper 12 can be defined in the same manner, and is designated $L_n$. The surface land width or thickness of annular base surface 14 is shown as $W_b$ in FIGURE 1.

A curtain area corresponding to the nozzle surface 16 can be defined as the product of the mean perimeter $P_n$ and the nozzle surface clearance distance $L_n$. This represents the outside surface area of an imaginary cylinder having a circumference $P_n$ and a height $L_n$. A curtain area corresponding to the base surface 14 can likewise be defined as the product of the mean perimeter $P_b$ and the base surface clearance distance $L_b$. Since the variable flapper clearance distances $L_b$ and $L_n$ are included in the respective mean curtain area expressions, it follows that the mean curtain area magnitude vary as a function of flapper position.

I have found that by properly relating the above mentoined areas and lengths of the nozzle 11 that vibrations of the flapper 12 while performing its modulating function can be substantially eliminated. That is, when the curtain area of the base surface 14 is within the range of about 4 to about 40 times the curtain area of the nozzle surface 16, and the land width $W_b$ of the base surface 14 is at least about 3 times the clearance to the flapper $L_b$, a condition will exist which will add sufficient damping to the system to substantially eliminate vibrations within the flapper 12. For a given set of dimensions falling within these ranges, air issuing from channel 18 flows radially outward and over surface 16, creating an annular cushion of air between base surface 14 and flapper 12 that dampens the vibratory motion of flapper 12.

In FIGURES 3 and 4 there is shown a preferred embodiment wherein the mean radius of the base surface 14 is increased without increasing its outer radius. It is done by extending connecting surface 15 into member 13, thereby creating an annular recess 23 between the base surface 14 and the nozzle surface 16. This has the effect of increasing the base surface inner radius and thereby creating an increased base surface mean radius $R_b$. The ratio of the base land width $W_b$ to the base surface clearance distance $L_b$ must continue to be a minimum of 3 for damping to occur.

As an example of an embodiment constructed in accordance with FIGURES 3 and 4, adequate damping is provided where base surface 14 has an inner radius of .043 inch, an outer radius of .058 inch and a mean radius of .0505 inch; nozzle surface 16 has an inner radius of .010 inch, an outer radius of .014 inch and a mean radius of .012 inch; and the base surface land width is .015 inch.

Another method of increasing the base surface mean radius without enlarging its outer radius is shown in FIGURES 5 and 6. In these figures, connecting surface 15 slopes from nozzle surface 16 to base surface 14 to provide the same function as annular recess 23, thereby creating a mean radius $R_b$ As indicated here and in the other embodiments, the shape of the connecting surface 15 can assume various forms and still provide this function.

FIGURE 7 discloses the inventive nozzle with a condition responsive flapper mounted in such a manner as to be susceptible to vibration. The flapper 12 in this case responds to changes in temperature, being connected to a curved bimetal 19 which is mounted on a base member 22 of a pneumatic thermostat. This conventional method of mounting the flapper is disclosed in further detail in Patent No. 2,828,077, issued to Richard C. Mott on Mar. 5, 1958, and Patent No. 3,212,710, issued to John D. Nilles on Oct. 19, 1965.

While the embodiments shown in the several drawings are generally round in cross-section, the inventive concept can easily be incorporated into nozzles of various other shapes. A mean perimeter can be established for any given surface having an inner and outer perimeter, and it follows that a curtain area therefor can likewise be determined. This is true even if base surface 14 and nozzle surface 16 are not parallel; all that is necessary is that flapper 12 mate properly with the nozzle surface 16 to effectuate a proper seal when they come into contact. In the case of nonparallel surfaces, the curtain area corresponding to base surface 14 would assume the form of a truncated cylinder, having a surface area equal to the product of the mean perimeter $P_b$ and the average clearance distance between base surface 14 and flapper 12. Likewise, it would be necessary to compute the $W_b/L_b$ ratio by taking $L_b$ to be the average clearance distance between the base surface 14 and the flapper 12 for a given flapper position.

There are no specific dimensional requirements for the flapper 12, other than that it have a sufficient area exposed to the vibration-damping cushion of air. As indicated above, the damping function occurs without regard to the flapper fundamental frequency.

The claims set out below indicate that modifications other than those described above can be made without departing from the scope of the invention.

The embodiments of the invention in which an exclusive property or right is claimed are defined as follows:

1. Apparatus for damping vibrations within a pneumatic condition responsive control device, comprising:
    a nozzle member connected to the pneumatic device and having first and second essentially flat surfaces lying in spaced planes, the first surface projecting above the second surface and being smaller in area than the second surface, the first and second surfaces each having an inner perimeter and an outer perimeter which define a mean perimeter and a surface land width;
    a third surface connecting the first and second surfaces, the third surface joining the first surface at its outer perimeter and joining the second surface at its inner perimeter;
    a channel of predetermined cross-sectional area within the nozzle member, the channel having first and second ends, the first end adapted for connection to a fluid pressure source and the second end opening on the first surface so as to coincide with the inner perimeter of the first surface;
    a flapper acting cooperatively with the nozzle member for variably throttling the fluid passing therethrough, the flapper mounted to the pneumatic device so as to be susceptible to vibration, and movable to and from the nozzle member in a direction essentially normal to the first surface in response to changes in the controlled condition thereby establishing a modulated control pressure upstream from the nozzle;
    a curtain area formed between each of the first and second surfaces and the flapper, a curtain area being defined as the product of the mean perimeter of a surface and the average clearance distance between that surface and the flapper;
    the first and second surfaces having perimeter dimensions to provide for a ratio of curtain areas varying from about four to forty, and to provide a second surface land with of at least about 3 times the average clearance distance between the second surface and the flapper.

2. The apparatus as recited in claim 1, wherein the first and second surface are parallel.

3. The apparatus as recited in claim 1, wherein the first surface is symmetrically shaped, and the second surface is symmetrically shaped.

4. The apparatus as recited in claim 3, wherein the first and second surfaces have a common center.

5. The apparatus as recited in claim 3, wherein the first and second surfaces are annular.

6. The apparatus as recited in claim 1, wherein the third surface is commonly perpendicular to the first and second surfaces.

7. The apparatus as recited in claim 1, wherein the third surface extends into the nozzle member to form a recess in the nozzle member between the outer perimeter of the first surface and the inner perimeter of the second surface, thereby effectively increasing the mean perimeter of the second surface.

8. The apparatus as recited in claim 1, wherein the third surface slopes from the outer perimeter of the first surface to the inner perimeter of the second surface thereby effectively increasing the mean radius of the second surface.

9. The apparatus as recited in claim 1, wherein the flapper is temperature sensitive and mounted in cantilever fashion.

10. The apparatus as recited in claim 9, and further comprising a U-shaped bimetal attached at one end to the pneumatic device, the other end of the U-shaped bimetal being attached to the flapper.

References Cited

UNITED STATES PATENTS 2,295,728   9/1942   Gess _____ 236—82 X
2,828,077   3/1958   Mott _____ 236—82
3,140,047   7/1964   Holloway _____ 236—47 X
3,212,710   10/1965  Milles _____ 236—87

WILLIAM J. WYE, *Primary Examiner.*

U.S. Cl. X.R.

236—82, 47, 102; 137—82